Oct. 24, 1944.  E. T. WYMAN  2,360,925
PROCESS FOR PREVENTING LEAKAGE IN RUBBER ARTICLES AND THE LIKE
Filed Aug. 29, 1940   2 Sheets-Sheet 1
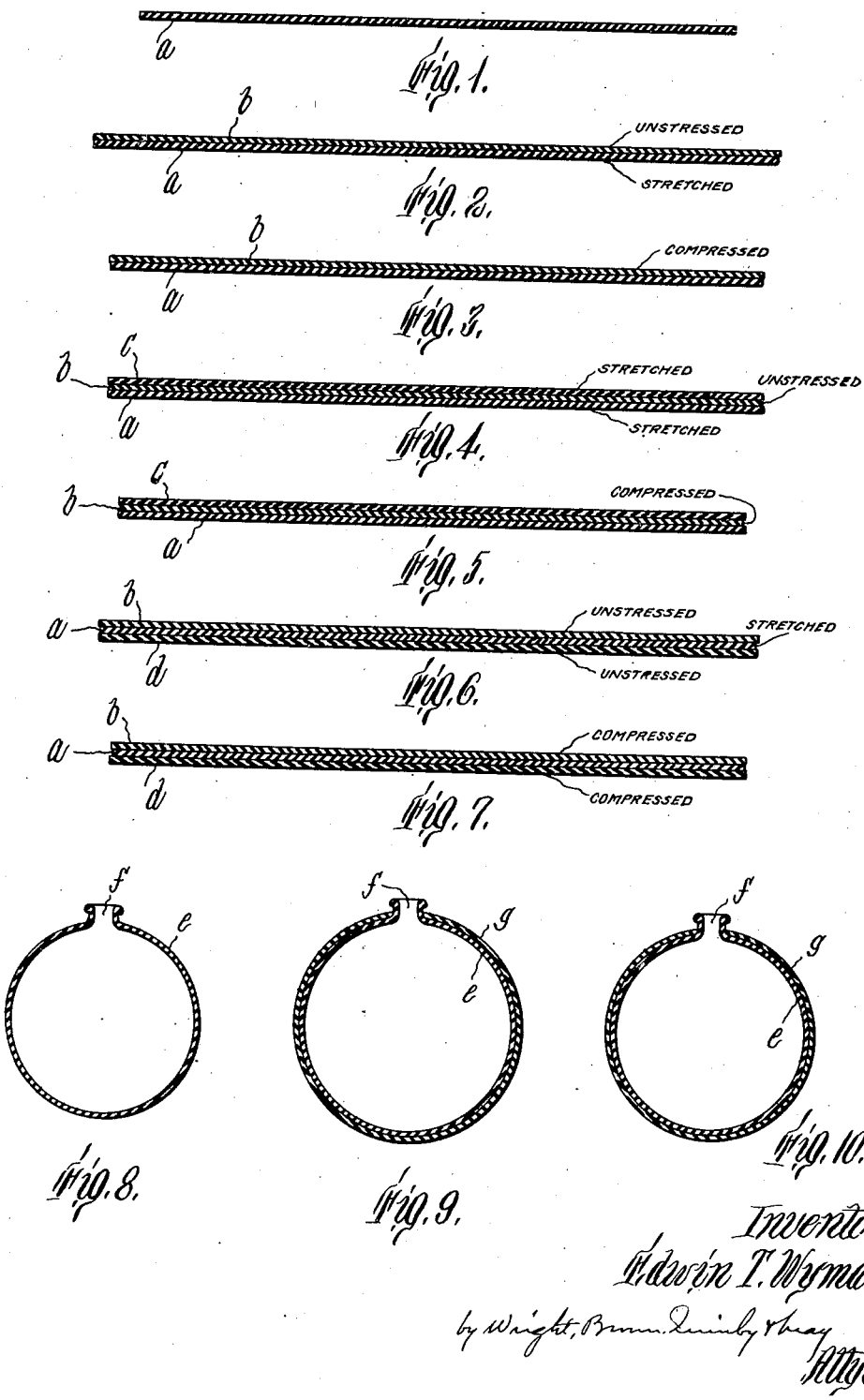

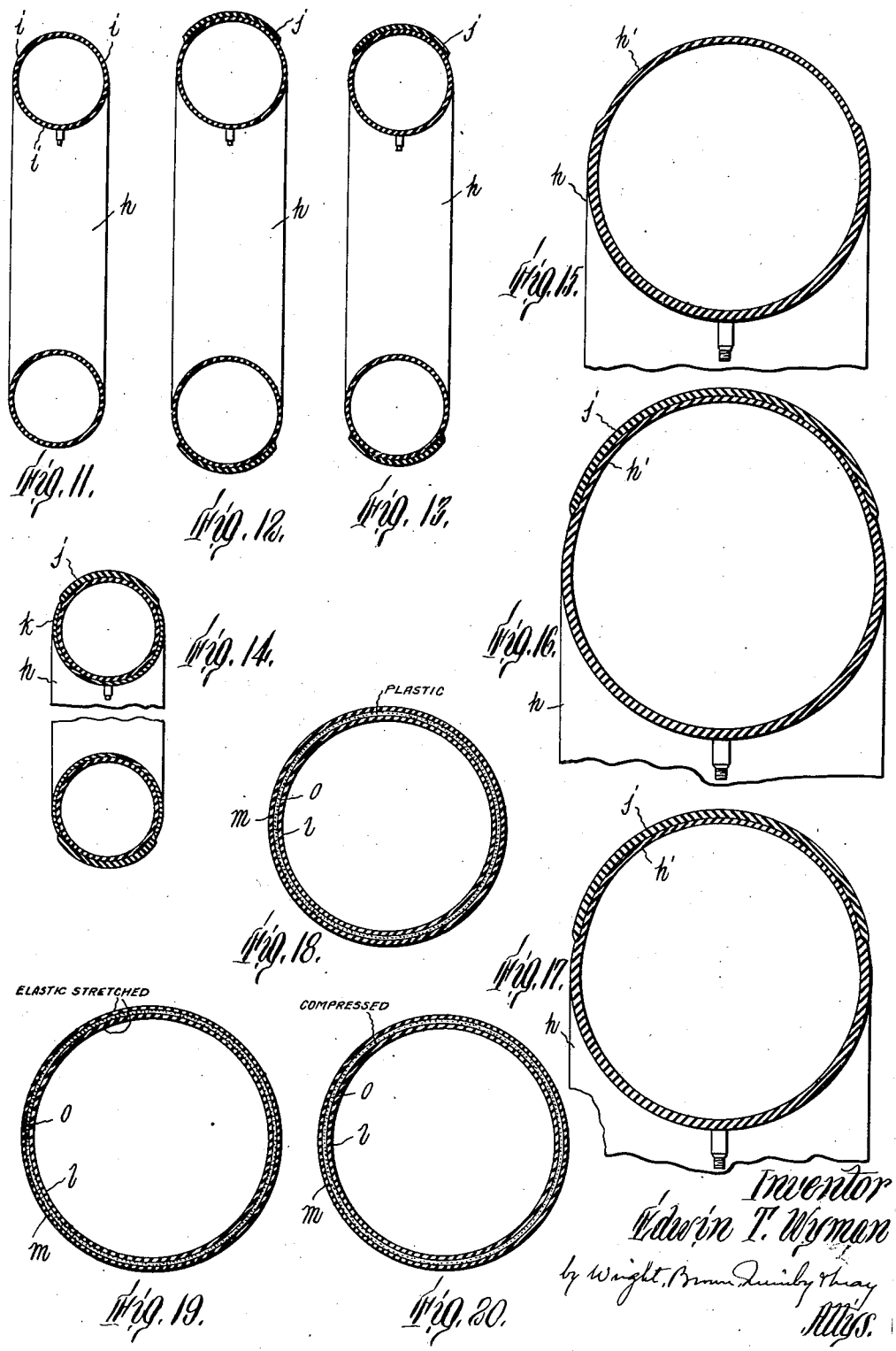

Patented Oct. 24, 1944

2,360,925

UNITED STATES PATENT OFFICE 2,360,925

PROCESS FOR PREVENTING LEAKAGE IN RUBBER ARTICLES AND THE LIKE

Edwin T. Wyman, Brookline, Mass.

Application August 29, 1940, Serial No. 354,764

3 Claims. (Cl. 154—15)

The present invention relates to means for preventing leakage of fluids through sheets and the walls of hollow articles, made of rubber or the like, when punctured, and to prevent the slow diffusion of air or other gas under pressure in a container made of or lined with such material whether punctured or not. The articles and goods in which this invention has utility include inner tubes for tires; hollow and inflated rubber balls of all kinds, including bladders for footballs and other covered playing balls; hot water bags and other flexible bags and bottles designed to contain liquid; fuel tank linings and envelopes or outer sheathings for such tanks; pneumatic mattresses and cushions; rubber footwear and parts thereof; rubber garments of all kinds; rubber sheetings, blankets, tubs, wash basins and the like; balloons; impervious caps or mouth coverings for containers of sterile medical supplies; and in general all articles and goods made of rubber designed to hold or confine liquids or gases.

The term "rubber" is used in this specification and in the following claims in a generic sense to include natural rubber whether vulcanized or unvulcanized or containing vulcanizing compounds, and so called synthetic rubbers or artificial rubbers which have similar properties of resistance to permeation by water and air. The words "the like," when used in association with the word "rubber" herein, are intended to include substances having similar properties to rubber which may not be included within the classification of artificial or synthetic rubber. The invention consists in the procedure of making goods and articles of the character above referred to more effective to prevent leakage when punctured, as well as to resist slow diffusion of confined gas; and in the articles and products resulting from such procedure. The accompanying drawings illustrate the principles involved and some of their practical applications.

In these drawings—

Figs. 1, 2 and 3 represent in section a fragment of a rubber sheet or wall in successive stages of the procedure;

Figs. 4 and 5 are views similar to Figs. 2 and 3, respectively, showing the invention applied to an article composed of three laminations;

Figs. 6 and 7 are views similar to Figs. 4 and 5 showing a modification of the laminated structure;

Figs. 8, 9 and 10 are sectional views showing the application of the invention to a bag, ball or other hollow article;

Figs. 11, 12 and 13 are sectional views showing the application of the invention to an inner tube for pneumatic tires;

Fig. 14 is a view similar to Fig. 13 showing a modification of the inner tube represented in that figure;

Figs. 15, 16 and 17 show a further modification of the inner tube invention in successive stages of the procedure by which it is completed;

Figs. 18, 19 and 20 are diagrammatic sectional views showing a modification of the invention which is applicable to any of its forms.

Like reference characters designate the same parts wherever they occur in all the figures.

The fundamental principle of the invention consists in making a laminated construction of elastic, resilient, and highly distensible impervious rubber composition or the like, in which the adjacent layers are bonded together throughout substantially their entire common areas and at least one layer is maintained under compression by stresses exerted by one or more contiguous layers. Such a construction, consisting of two layers, is illustrated in Figs. 1, 2 and 3. Said construction is made in the following manner. A layer or sheet $a$, of vulcanized rubber composition, or similar material having sufficient extensibility and resilience, is stretched. The extent of stretching may be of any desired amount within the elastic limit of the material. For most practical purposes, however, an enlargement of dimensions in the order of from 10% to 20% is feasible and satisfactory. A layer or sheet $b$ of flexible, elastic and substantially fluid impervious material, in unstressed or equilibrium condition, is applied to the stretched layer $a$ and bonded thereto securely while the layer $a$ remains in stretched condition.

The applied layer $b$ may be a previously formed sheet of vulcanized rubber, or of a vulcanizable solid mixture of rubber with vulcanizing agents. Or it may be applied in liquid or semi-liquid condition, as by dipping, spraying, brushing, flowing, or any other suitable manner. The strongest and most continuous bond possible to be obtained between the layers is desirable. Practically satisfactory bonds may be obtained between previously vulcanized sheets or layers by cement. Or an unvulcanized composition may be bonded by vulcanization to a sheet of previously vulcanized rubber or the like. An essential of the invention is that, while the layer $b$ at the time of application may be any one of many compositions and bonded to the base sheet in any one of many ways, provided only that it is not under any substantial stretch or tensile stress, the layer $a$ must be resilient and under stress throughout such time as is needed to produce a secure bond between the two layers.

When a sufficiently secure bond has been effected, the stretched layer is released. It tends to return to its original dimensions by virtue of its resilience, and in contracting it exerts force through all the points of union on the applied layer, tending to bring the latter to smaller than original dimensions, thereby exerting compressive force on that layer and thereby putting it in a state of compression. The laminated structure reaches a condition of equilibrium when the layer $b$ is compressed to somewhat less than its original area and the layer $a$ is still somewhat greater in area than originally. These conditions are represented in Figs. 1, 2 and 3 where the comparative lengths of the fragments there shown indicate the proportion of stretch given to the layer $a$ and of subsequent contraction to the bonded laminations.

Laminated sheets of the character thus described may be used in making any of the articles, goods and manufactures in which sheets of rubber are used. They may also be fashioned into linings or envelopes for tanks, such as fuel tanks of airplanes and vehicles used in war, which might be punctured by bullets and in which sealing of the punctures is desired. By virtue of the compressive stress constantly exerted in the layer $b$, the material of this layer is forced against the sides of a penetrating object and closes forcibly the puncture made thereby if the object passes all the way through, or is withdrawn.

The laminated structure may be made of more than two sheets. Figs. 4 and 5 show illustratively one made of three sheets, $a$, $b$ and $c$, of which the sheets $a$ and $c$ were stretched, bonded against opposite sides of an unstressed sheet or layer $b$, and then released. Figs. 6 and 7 show a variant of the form last described, in which two sheets, $b$ and $d$, of unstressed material are bonded to the opposite sides of a stretched elastic sheet $a$. In both cases contractile force due to the resilience of the previously stretched sheet or sheets is exerted to apply and maintain compressive stress to and in the unstretched sheet or sheets.

The same principle obviously may be applied to structures containing more than three laminations. In each case the finished article comprises a sheet or wall in which layers or strata under tensile stress alternate with layers or strata under compressive stress.

When the invention is applied to hollow objects, of a character such that they may be inflated, or distended by liquid, the base layer must be sufficiently impervious to the fluid used for distention to permit creation of the uniting bond. The article shown in Figs. 8, 9 and 10 typifies any hollow article, such as a ball, bag, balloon, bladder for covered balls, etc., of any shape. It is represented for convenience herein as a sphere $e$ having continuous walls completely enveloping and enclosing the interior space, with a passage $f$ through which it may be filled with distending fluid. The ball, bag or the like $e$ is distended by gaseous or liquid pressure until its walls are stretched to the desired degree, and then a covering $g$ is applied to the outside of these walls. Such covering may be of any of the characters or types described with respect to Figs. 1 and 2; and when made of rubber compositions suitable for vulcanization, but still unvulcanized, it may be applied in pieces, such as used in making three dimensional rubber articles. If the outer layer is made by dipping or otherwise applying a solidifiable liquid, a sufficient number of coats may be successively applied and dried to build up the layer to the desired thickness. Bonding may be effected with the aid of adhesives, by vulcanization or like welding action, or by natural coalescence or adhesion where materials are used which have the property of effecting union in such manner. After release of the internal pressure, the hollow article returns to dimensions intermediate those of the original body before and after distention, and the outer layer or covering $g$ is in a state of compression.

The same principles are used in making puncture sealing and diffusion resisting inner tubes for pneumatic tires. Fig. 11 shows in diametral sectional view a conventional or standard inner tube $h$ equipped with the usual valve $h'$ when filled with air sufficient to bring it to its original molded dimensions, in which its walls are unstretched. Such inner tubes are toroidal in shape having continuous endless walls completely enclosing the inflation air space. They are made each from a piece of raw rubber tubing, the ends of which are spliced together before vulcanization, and the endless annular tube so produced is inflated in an annular mold and there vulcanized. In order to provide such an inner tube with a puncture sealing tread, it is inflated to dimensions somewhat larger than the interior dimensions of the tire shoe or casing for which it is designed; say, for instance, until its circumference $i$—$i$—$i$ is in the order of 10% or 15% larger than the corresponding inside circumference of the shoe. An unstressed tread layer $j$ is applied and bonded to the tread portion of the inflated tube. Such tread layer may be such as the applied layers in the forms previously described and bonded in any suitable way, as described. Then, when the tube is brought to smaller dimensions, and specifically its dimensions when inflated in the tire casing, the tread layer $j$ is maintained under compression throughout all its area and in all dimensions by force through, and by the resilience of, the tube walls.

In case it is desired to increase the imperviousness of the tube to slow loss of pressure by diffusion through its walls, the sides and rim portion of the tube may be covered by a layer $k$ of rubber or the like (Fig. 14). This layer may be considerably thinner than the tread layer, in the interest of economy. But whatever its thickness, it is put under compression by contraction of the tube walls to the dimensions for use.

Inner tubes of the character described may be initially molded with the tread portion $h'$ thinner than the sides and the rim portion, as illustrated in Fig. 15. Then upon inflation, such tread portion is distended proportionally more than the other parts of the tube, and a tread layer $j'$ of sufficient width to cover the thin portion $h'$ is applied to the latter (Fig. 16). When subsequently contracted to the internal dimensions of the tire casing (Fig. 17), the bonded tread layer is put under a greater stress of compression than would be the case if the tread part of the tube had been less distended.

A compressed layer may be incorporated between two stretched layers in an inner tube or other hollow article by making a body $l$ of vulcanized rubber and an outer shell or jacket $m$ of similar composition, surrounding but not bonded to the body, and placing plastic or fluid vulcanizable rubber composition o between the body and shell; as shown diagrammatically in Fig. 18. The resulting laminated structure is distended to dimensions larger than those of the unstretched jacket or shell, and while so distended the intermediate plastic layer is vulcanized or cured to solid elastic condition. Then upon release of the internal pressure the distended inner body and outer shell apply compressive stress to the intermediate layer.

Figs. 18, 19 and 20 show the initial, distended, and final stages of the structure last described in a diagrammatic way, as a sphere. This showing is intended to typify any of the hollow articles previously described, whether a tube, a ball, a bag or other article. The intermediate layer may be injected through the wall of the outer shell, in which case, when cured, it seals any punctures made in the shell by so injecting it. Or an equivalent layer may be applied to the body and then covered by an open jacket of which, after application, the edges may be overlapped and sealed. It may be so applied to the body and covered when the body is distended to the predetermined extent, or prior to its distention. When so built on a distended body, the jacket may be stretched in the course of application.

The foregoing description is not intended to be a statement or catalogue of all the articles and manufactures in which the invention may be embodied, nor all of the elastic and plastic materials and compositions which may be used in making such articles, nor all of the methods and procedures by which the articles may be fabricated. Rather it is intended to explain the principles of the invention in such manner that those skilled in the pertinent arts may apply existing knowledge of the arts to the production of useful articles having the essential features of bonded layers of which adjacent ones are respectively stretched and compressed.

What I claim and desire to secure by Letters Patent is:

1. The method of making puncture sealing hollow bodies, which consists in providing a hollow body and an enveloping outer shell, both of vulcanized rubber, of which the inside dimensions of the outer shell are larger than the outside dimensions of the body when both are in normal, unstretched condition, placing plastic or fluid vulcanizable rubber composition between said body and shell, distending the body and shell, by internal fluid pressure within the body, to dimensions larger than their normal dimensions, and thereby stretching their respective walls, vulcanizing the intermediate rubber composition while the body and shell are so stretched, and releasing the internal fluid pressure whereby the body and shell are permitted to relax and caused to apply compressive force to the intermediate rubber composition.

2. The method of producing a puncture-sealing inflatable hollow article, which consists in fabricating from vulcanizable rubber composition a hollow body having continuous walls which completely envelop and enclose an interior space adapted to receive fluid, vulcanizing the rubber composition of which said body is fabricated, distending the body by injecting into the enclosed interior space fluid under pressure and thereby stretching the walls in all directions proportionately to the intensity of the fluid pressure, uniting to at least a portion of the area of said stretched walls an unstretched layer of plastic material which is changeable from plastic condition to solid condition, so changing said material while the walls are stretched, and then releasing the fluid pressure from the interior of the body, thereby allowing the stretched walls to contract and exert compressive force on the united layer.

3. The method of making a puncture-sealing inner tube for tires, which consists in forming a tube of raw rubber composition, joining the ends of such tube together, inflating the tube within a toroidally concave mold until the tube walls conform to the surfaces of such mold and make a hollow toroid, vulcanizing the tube while so inflated in the mold, removing the tube from the mold and inflating it to dimensions larger than the interior of the mold whereby the walls of the tube are stretched in all directions, applying to the tread portion of the stretched tube around the circumference thereof and across the junction between the originally separate ends, and uniting thereto, a layer of unstretched rubber, and relaxing the inflation pressure of the tube so that the united layer is put under compression by the tension of the previously stretched walls.

EDWIN T. WYMAN.